UNITED STATES PATENT OFFICE.

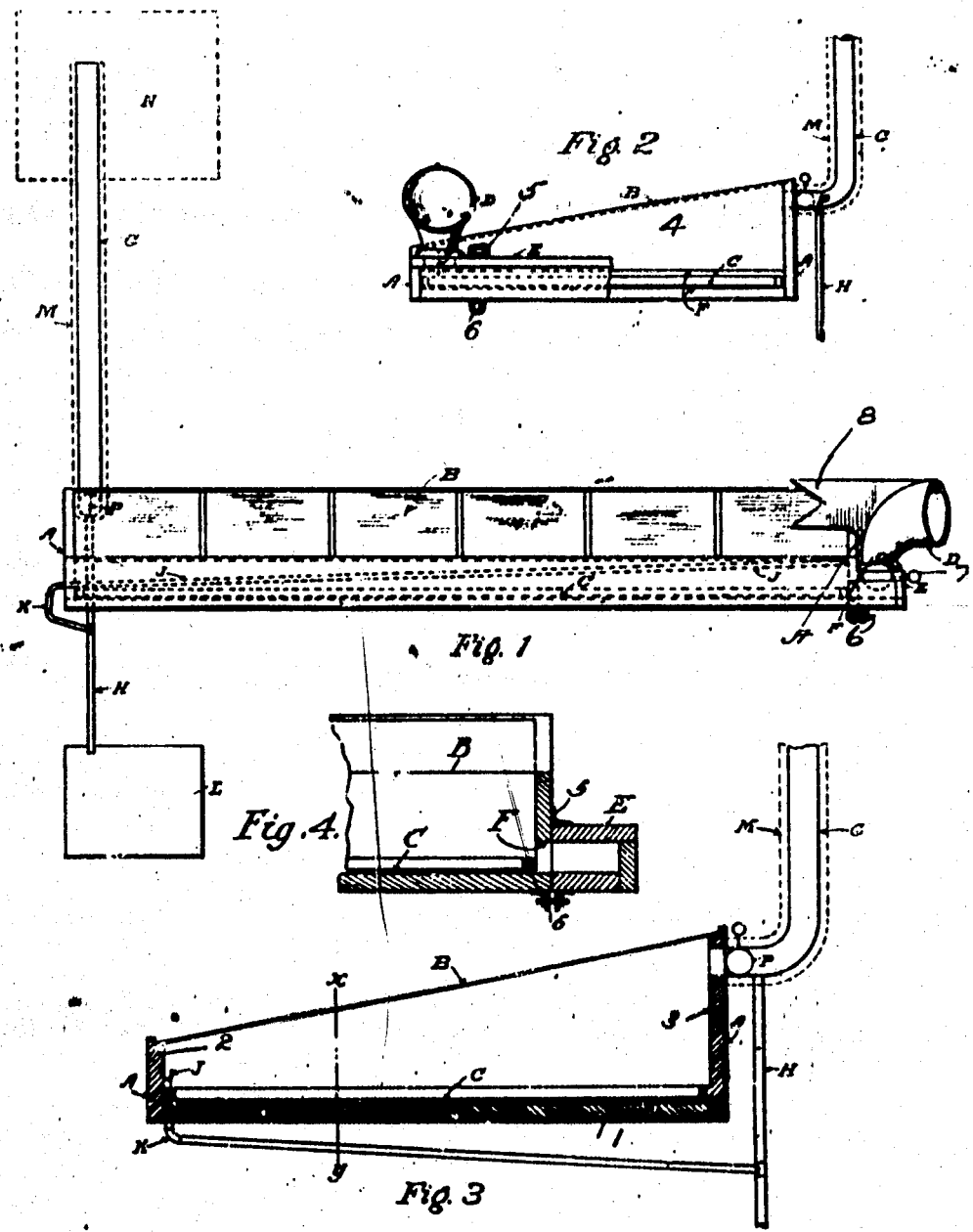
A. M. BROSIUS.
SOLAR STILL.
APPLICATION FILED OCT. 15, 1909.
983,424.  Patented Feb. 7, 1911.

ALBERT M. BROSIUS, OF BALTIMORE, MARYLAND.

SOLAR STILL.

983,424.   Specification of Letters Patent.   Patented Feb. 7, 1911.

Application filed October 15, 1909. Serial No. 522,739.

*To all whom it may concern:*

Be it known that I, ALBERT M. BROSIUS, a citizen of the United States of America, residing at the city of Baltimore, State of Maryland, have invented certain new and useful Improvements in Solar Stills, of which the following is a specification.

This invention relates to an apparatus by means of which solar heat is utilized in the evaporation of liquids particularly water and to an apparatus by which such liquids, when so evaporated, are condensed to produce the liquid in a purified state.

The apparatus may be so arranged that the condensed water is delivered at an elevation higher than that at which the water to be evaporated is presented to the apparatus. Thus solar energy is made to serve a double purpose. It evaporates the liquid to be distilled and elevates the vapor so that a head sufficient for the distribution of the condensed liquid is developed. The head thus obtained is determined by the strength of the draft created in the delivery pipe and the length of time the liquid can be caused to remain in the form of a vapor. It is also within the scope of my invention to collect the condensed liquid in any suitable reservoir to which it may be conducted by gravity or other suitable means.

Described in general terms, the apparatus consists of a solar heated box or receiving chamber having a transparent top, partition or roof, preferably inclined toward the sun. At one end of the box or chamber is an inlet for air, which I have shown provided with a rotary funnel which may be adjusted with its mouth in the direction of the wind. However, any other suitable means for introducing air may be used. Shown near the opposite extremity of the chamber is an upright flue of sufficient height to give a good natural draft. The liquid to be evaporated is admitted to this chamber and preferably maintained at a slight depth. For the purpose of holding this liquid so that the residue of the evaporation may be easily removed, I have shown a shallow tray which may be of cheap material to be destroyed and replaced at short intervals, so that cleaning the tray is not necessary. The trays are inserted and removed through a slot near the bottom of the chamber and this slot which is above and in its general direction parallel to the surface of the liquid also serves to distribute the air which enters by the funnel and passes along a conduit or box which communicates by means of the slot with the interior of the chamber. The primary purpose of the slot is to admit the entering draft of air and distribute it in a thin current over the surface of the liquid, so that as it passes it is heated and its capacity for supporting moisture is increased, whereby it takes up the liquid in the form of vapor, which passes up the flue with the air and is condensed, both on the exposed surfaces of the chamber walls and on the walls of the flue.

In the preferred embodiment of my invention an elevated tank and condenser are used, the flue is insulated so that condensation does not take place until the vapor reaches the tank. For the purpose of catching the liquid which may condense on the inner surface of the roof of the chamber, I have shown a trough running along the side of the chamber beneath the lower edge of the roof. A pipe from this trough leads to a suitable receptacle, and in case the elevated tank is not to be used, the flue, which in this case acts as a condenser, is drained to the same receptacle.

Referring to the drawing: Figure 1 is a side elevation of the apparatus. Fig. 2 is an end view with a portion of the conduit and the flue broken away. Fig. 3 is a cross-section through the end of the apparatus taken centrally of the flue. Fig. 4 is a fragmentary section on the line x y of Fig. 3, showing the movable duct and the slot with the removal pan.

An embodiment of my invention substantially in the form in which it has been built and reduced to practice is shown in the drawings. In these drawings, the receiving chamber A somewhat resembles a horticultural hot-bed and consists of a suitable inclosure or box having a floor 1 and upright sides, preferably of material which affords considerable resistance to the passage of heat. The front wall 2 is shown as of less height than the rear wall 3, and the top edges of the two sides 4 are inclined. The roof or top B of the chamber is of suitable transparent material, as glass, and as shown is inclined so as to be as nearly as possible at right angles to the general direction of the sun's rays. Shown as extending horizontally along the lower edge of one of the side walls 4 of the receiving chamber is a conduit E which is removably secured to the side wall by any suitable means, as hinges 5 at the top, and bolts 6 at the bottom. The conduit E communicates with the interior of the receiving chamber by means of a slot F at the base of the side wall of the latter, shown as extending the full length of such side wall. A pan or other suitable receptacle C of horizontal extent such that it fits within the chamber and very shallow in proportion to its area covers the bottom of the chamber and is removed and inserted through the slot F, the conduit being swung upward about its hinges to open the slot for this purpose. Removably mounted in an aperture in the upper wall of the conduit E to rotate therein is an elbow funnel D extending upward vertically from the top of the conduit and bent at an angle so that its mouth opens horizontally. This funnel is provided with a handle or other suitable means 7 for rotating it so that it faces the wind. This may be accomplished manually or by a vane 8 attached to the funnel. The primary function of the slot F, while it serves as an aperture through which the pan C may be removed, is to admit air to the chamber from the conduit E. Leading from the extremity of the chamber A opposite the funnel is an upright flue G of sufficient height to give a good natural draft from the chamber A, due to the expansion of the air and its decreased weight per unit of volume caused by the heat of the sun's rays admitted through the transparent roof of the chamber A. A suitable receptacle L may be provided for the condensed liquid and a pipe H leads to this chamber from the base of the flue G which, it will be noted, is bent to prevent such moisture flowing back into the chamber A. Another pipe which leads from a conductor J within the chamber serves to catch the condensation from the inner surface of the glass roof.

If it is desired to elevate the condensed liquid, the flue G is insulated, as indicated by dotted lines M and the tank or condenser N, also indicated by dotted lines, is provided. The insulation prevents condensation on the walls of the flue and allows the moisture to be carried up by the draft to the tank where it is condensed by suitable means. Dampers O and P serve to close the funnel and flue at the will of the operator.

In the operation of my device, the liquid to be evaporated is supplied to the pan C, either continuously or at intervals. The funnel D is turned toward the wind, either manually or by means of a vane 8, or air is supplied to the inlet by other suitable means. The sun's rays pass through the transparent roof or cover of the chamber A and raise the temperature of the air which has been admitted to increase its temperature of saturation or capacity to receive moisture, whereby it is caused to take up the liquid in the form of vapor, and to this end, the slot F serves to distribute the air admitted in a layer over the surface of the liquid. As the air becomes heated its weight per unit of volume is decreased by expansion and as it is lighter than the outside air, it tends to rise through the funnel G, creating a natural draft and carrying the vapor upward, to be either condensed on the walls of the flue or in the tank N, depending on the arrangement of the apparatus, either with an elevated tank N and insulated flue, or a bare flue which serves as a condenser draining into the lower tank L.

The details and form of my apparatus are largely immaterial and may be widely changed within the scope of my invention.

What I claim and desire to secure by Letters Patent is:

1. In a device for evaporating liquid, a solar heated chamber for the liquid to be evaporated, the chamber having an air space over the liquid, and an outlet, an inlet funnel, a conduit to which the funnel leads extending along one side of the chamber and removably secured thereto, the wall separating the conduit and the chamber being apertured to admit air to the chamber from the conduit, a shallow pan covering the bottom of the still and of suitable dimensions to be removed and admitted through the aperture when the conduit is removed.

2. In a still having a solar heated chamber an upright flue, and an inlet the walls of the flue being insulated to prevent the passage of heat, a storage chamber or condenser elevated above the solar heated chamber and communicating with the upper extremity of the flue so that solar energy is utilized to evaporate the liquid and furnish a head for distribution of the distillate.

Signed by me at Baltimore, Maryland, this 14th day of October 1909.

ALBERT M. BROSIUS.

Witnesses:
EDWARD L. BASH,
JNO. MINIE.